March 5, 1968  E. R. ANDERSON  3,371,806
PIPE FEEDING SYSTEM
Filed July 20, 1966  2 Sheets-Sheet 1
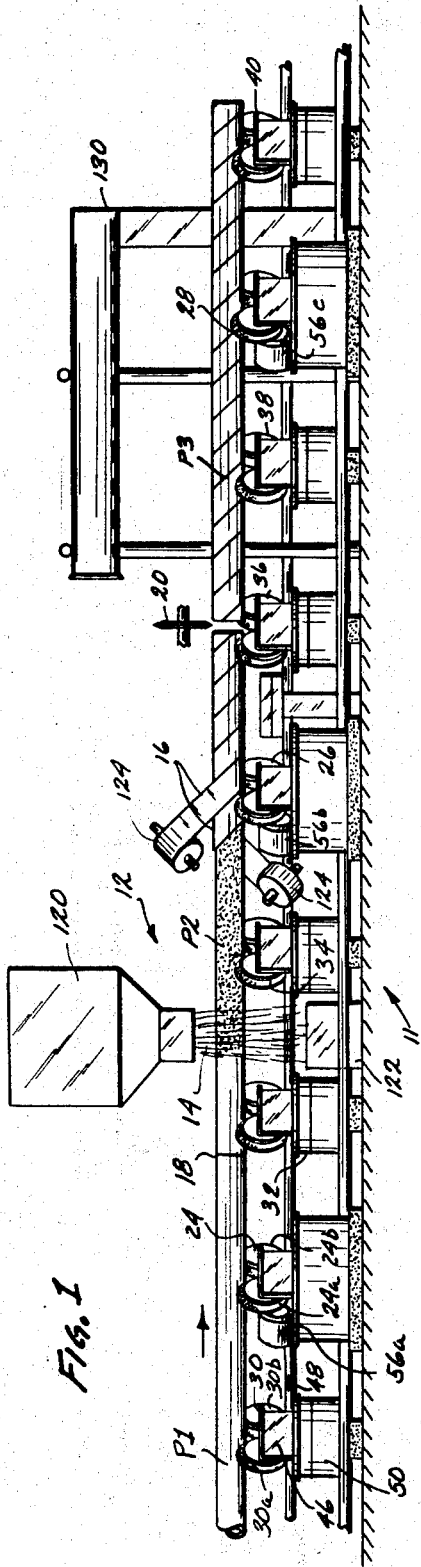
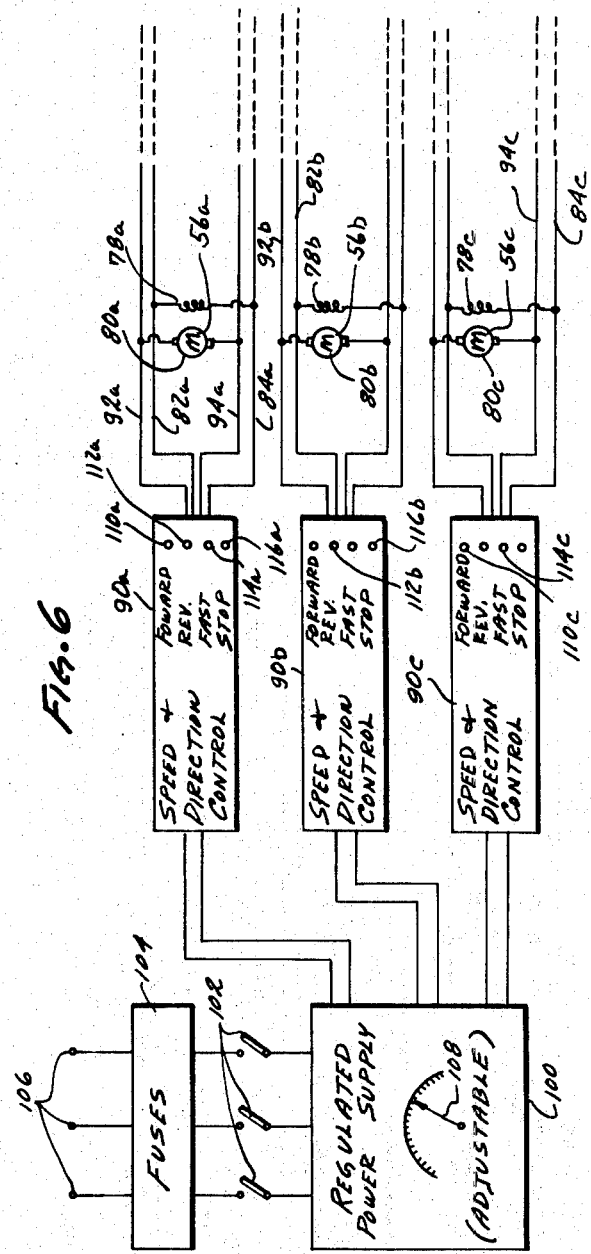
INVENTOR
EVERETT R. ANDERSON
ATTORNEYS March 5, 1968  E. R. ANDERSON  3,371,806
PIPE FEEDING SYSTEM
Filed July 20, 1966  2 Sheets-Sheet 2
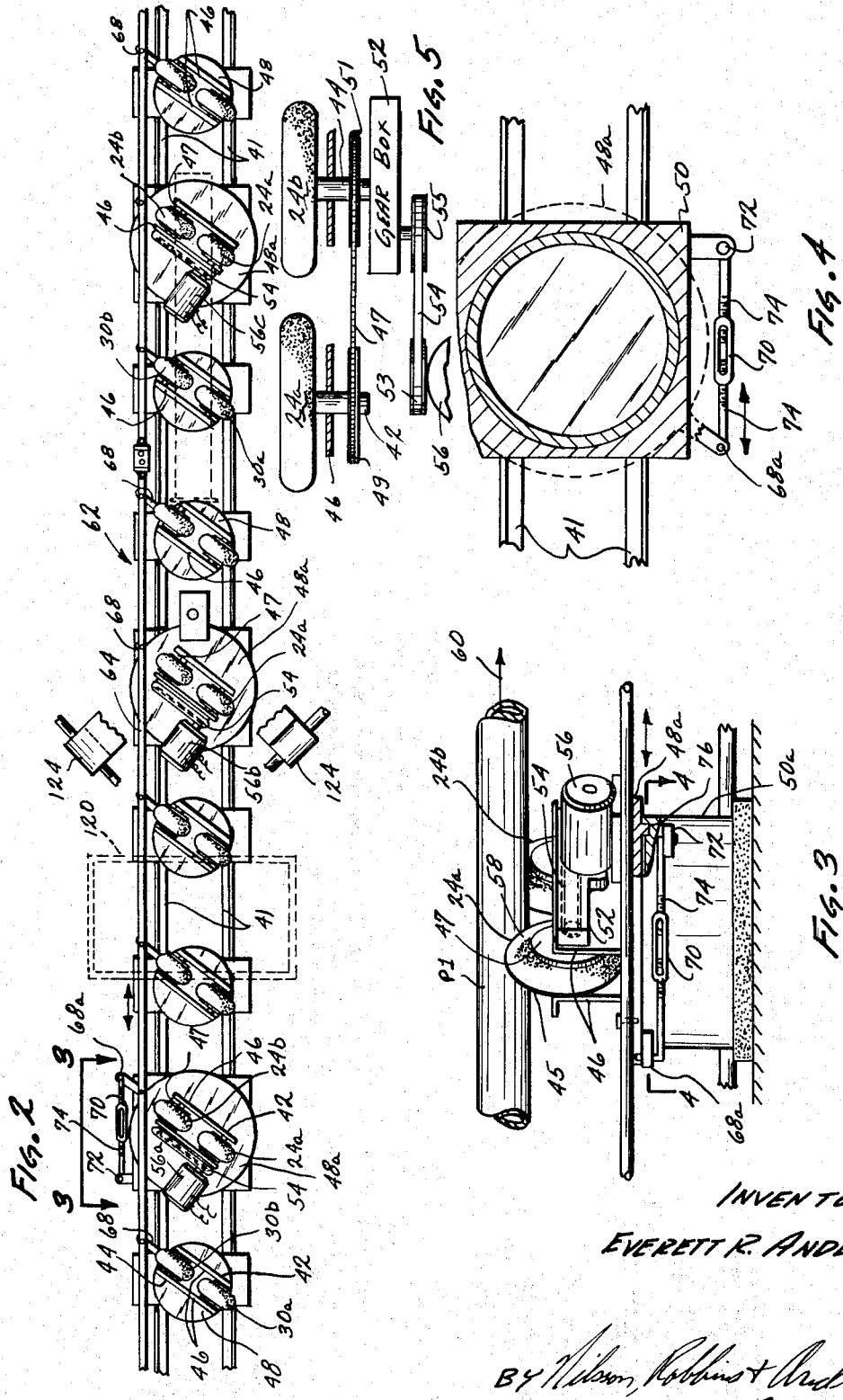
INVENTOR
EVERETT R. ANDERSON
BY Wilson, Robbins & Anderson
ATTORNEYS

United States Patent Office 3,371,806
Patented Mar. 5, 1968

3,371,806
PIPE FEEDING SYSTEM
Everett R. Anderson, Pico Rivera, Calif., assignor to Pacific Pipeline Construction Company, a corporation of California
Filed July 20, 1966, Ser. No. 566,660
9 Claims. (Cl. 214—339)

ABSTRACT OF THE DISCLOSURE

A conveyor is disclosed for transporting pipes through a treatment station with combined axial and rotary motion to facilitate operations as coating and wrapping. The conveyor incorporates three groups of wheel-pairs, in which each pair of wheels is angularly displaced or canted in relation to the path of travel to accomplish the desired rotary-linear motion. Each of the three groups also includes a motive means to revolve the associated individual wheels, coupled together by the pipe in process. A control system is then incorporated to control each motive system whereby to synchronize the motion of pipes through the treatment station.

The present invention relates to a pipe processing system and more specifically to an apparatus for conveying lengths of pipes, which apparatus functions in direct cooperation with a pipe treating structure through which the pipes are moved axially as they are simultaneously revolved for processing.

Various manufacturing techniques are widely employed to treat, coat and otherwise process lengths of pipe. For example, pipe is sometimes coated as with tar, then wrapped, as with paper or other material to provide a protective shield. Several different techniques have been used in the past to convey sections of pipe past a processing station at which, for example, the pipe may be coated and wrapped. It has been found particularly practical to treat sections of pipe by revolving the pipe during its linear motion so that a given point on the pipe actually traverses a helical path. In such movement, the pipe not only exposes its total surface, but furthermore can draw a wrapper from a roll of sheet medium.

In passing a series of pipes through a treating station. it is important that they be maintained in abutting relationship so that the treatment operation need not be interrupted between pipes. That is, pursuing the example of coating and wrapping a series of pipe sections, it is evident that the sections of pipe must pass through the treating apparatus in abutting relationship to maintain the wrapping continuous and orderly. In other pipe processing apparatus, abutting relationship of the pipes is also important; for example, to continuously dispense materials onto the sections of pipe without waste, and to shield the pipe interiors from various materials used in processing.

Various apparatus have been proposed in the past for conveying sections of pipe through a treatment station as described, and incorporating apparatus for positioning and preserving the pipes in longitudinal abutting relationship. In considering this problem, it may be seen that when a section of pipe is loaded onto the conveying apparatus, it will invariably undergo some displacement before the next pipe can be loaded. Therefore, the problem has been to close the gap between adjacent sections of pipe before that gap enters the processing station. In a related aspect, it has also been found desirable to have the capability to accomplish a displacement gap between a pipe that has been processed and a pipe currently in process. Such facility permits a completed pipe to be displaced from the pipe in process so as to be removed conveniently, without interfering in the processing operation.

As indicated, a variety of techniques have been proposed in the past for accomplishing relative displacement between sections of pipe as they are carried on an axial-rotary conveyor. One form of such structure incorporates a conveyor comprising pairs of rotatably mounted cooperating wheels placed along the path of the pipe. The wheels in each pair are spaced apart with their axes of rotation parallel and offset from the linear path that is to be traversed by the pipe sections. In such an arrangement, revolving the wheels causes the pipe sections to move along a linear path while concurrently revolving. The desired displacement between pipe sections is then accomplished by providing different coefficients of friction for the engaging surfaces of the wheels along with the controlled speed variation. Specifically, in such a prior arrangement, the wheels which carry the pipes through the treatment station might be faced with non-slip material and driven at the desired rate to accomplish a specific rate of movement for the pipe. The adjacent sets of wheels, which carry the pipe into the treatment station, might then be driven at a higher speed; however, would be provided with low friction surfaces to engage the pipe. As a result, upon loading a section of pipe onto the conveyor, the fast-moving low-friction wheels would move the pipe until it closed on the next adjacent forward pipe, then the newly-placed pipe would slide in the supporting wheels pending its delivery to the treatment station. Although such structures have operated satisfactorily in the past, it is sometimes difficult to preserve the critical frictional relationship requisite to successful operation of the systems.

Another proposed solution to the problem has been to provide complex mechanical linkages, e.g. transmissions and mechanisms, for accomplishing desired displacement between pipes on the conveyor. However, such systems have generally been expensive to produce and rather delicate in operation.

It is therefore an object of the present invention to provide an improved conveyor for sections of pipe, to transport such sections through a processing or treating apparatus, with linear and rotary movement, which conveyor spystem is economical to manufacture and operate, reliable in operation, and effective to accomplish the desired relative displacements between sections of pipe.

Another object of the present invention is to provide an improved structure for processing pipes in abutting relationship, which structure may receive the pipes in spaced-apart relationship.

Another object of the present invention is to provide an improved pipe conveyor of the type wherein pipes are individually moved sequentially through a treatment station in linear axial motion, and simultaneously revolved to accommodate the treatment apparatus.

One further object of the present invention is to provide an improved pipe conveyor which is economical, durable, and facilitates the control necessary to accomplish various relatived displacements between pipes that are sequentially carried by the system.

These and other obects and advantages of the present invention will become apparent from a consideration of the following detailed description which is provided in conjunction with the appended drawings, wherein:

FIGURE 1 is a perspective and diagrammatic view of a pipe-treating system constructed in accordance with the principles of the present invention;

FIGURE 2 is a top plan view of a portion of the structure of FIGURE 1;

FIGURE 3 is a vertical side view taken along line 3—3 of FIGURE 2;

FIGURE 4 is a horizontal sectional view taken along line 4—4 of FIGURE 3;

FIGURE 5 is an enlarged fragmentary view of a portion of the structure of FIGURE 2, as also shown in FIGURE 3; and FIGURE 6 is a diagrammatic representation of the electrical system incorporated in the structure of FIGURE 1.

Referring initially to FIGURE 1 for a preliminary consideration of the system, sections of pipe P1, P2 and P3 are shown on a conveyor 11 which transports pipe from left to right through a processing station 12. The functions of the processing station 12 may vary widely; however, in the illustrative example, a viscous fluid 14 is applied to the sections of pipe as they are revolved about their axis and moved linearly along their cylindrical axis. Thereafter, the revolving sections of pipe draw wrappers 16 from spools for placement on the pipe, covering the deposited fluid 14. In other embodiments, the processing station 12 may comprise a pipe-cleaning apparatus, e.g., a grit blasting unit, as is well known in the prior art.

In moving the pipe sections through the treating station 12, it is important to establish an abutting relationship between the pipes P1 and P2 as shown, at the junction 18. Of course, the pipe P1 is loaded onto the conveyor 11 after the pipe P2 has entered the treating station 12; therefore, an initial space or gap exists at the junction 18. In accordance with the system hereof, as described below, the conveyor moves the pipe P1 at an accelerated rate until the gap at the junction 18 is closed. Thereafter, the pipes move through the treating or processing station 12 and emerge to the position illustratively occupied by the pipe P3. With the pipe P3 in such a position, a blade 20 severs the applied coating at the junction 22 between the pipes P2 and P3, so that the system may move the pipe P3 to the right (as shown) at an accelerated pace to develop a sizable gap from the junction 22 for convenient removal of the pipe P3 from the conveyor system 11. These relative displacements between the pipe sections are accomplished in accordance with the present invention by an electrical system with the capability for independent control as will be considered in detail below.

The pipe sections are moved in sequence through the treating station 12 by the conveyor system 11 which receives rotational drive at spaced-apart pairs of rotatively-mounted cooperating wheels. Specifically, as shown in FIGURE 1, drive wheels 24 are shown in a relationship to act on the pipe P1, drive wheels 26 on the pipe P2 and drive wheels 28 on the pipe P3. Spaced along the path of travel, on either side of the drive wheels 24, 26, and 28 are pairs of idler or support wheels which carry the pipes and accommodate their rotative linear motion thereof. Specifically, idler wheels 30 and 32 are mounted on opposite sides of the drive wheels 24, idler wheels 34 and 36 are mounted on opposite sides of the drive wheels 26 and idler wheels 38 and 40 are mounted on opposite sides of the drive wheels 28.

The rotary straight line or linear movement of the pipes across the drive wheels as shown is accomplished as a result of the angular offset between the axis of the pipes and the rotative axis of the wheels. That is, the wheels resolve about a two common axes of rotation which are parallel and angularly offset from the cylindrical axis of the pipe as shown. As a result of the offset relationship, the pipes are revolved and translated linearly along the conveyor 11.

As shown, each set of wheels includes two spaced-apart individual wheels, e.g. wheels 30a and 30b, which are rotatively supported on axles 42 and 44 respectively (FIGURE 2). The axles 42 and 44 are held substantially horizontal by spaced-apart vertical flange plates 46 extending upwardly from a circular horizontal adjustment table held on a support stand 50 (FIGURE 1) all of which are ganged together. That is, the support stands 50 are supported on a common base and are also held interconnected by rails 41. The individual wheels (FIGURE 3) each include a rubber tire 58 carried on a rim wheel 47. The treads of the tires 45 carry the pipes to provide good frictional engagement.

The sets of wheels as shown are all similar (FIGURE 2) as described above with cooperative structure; however, the drive wheels are mounted on a larger table and incorporate motive apparatus. Specifically, the drive wheels 24a and 24b (FIGURE 5) are supported on axles 42 and 44 as previously described; however, additionally, the axles 42 and 44 are also mechanically interconnected by a chain 47 extending between sprockets 49 and 51 axially affixed to the axles 42 and 44 respectively. The axle 44 also extends to a gear box 52 which is driven through a drive belt 54 connected to a motor 56. The belt 54 extends between a motor pulley 53 and a drive pulley 55. Thus, the wheels 24 are driven in synchronized rotation. The system for energizing the motors 56a (FIGURE 2) 56b and 56c to drive their associated drive wheels will be considered in detail below; however, it is to be understood that the associated gear boxes employed in cooperation with each of the motors are similar so that when the motors 56 operate at a common speed, the associated drive wheels 24, 26, and 28 are driven at the same speed.

As shown in FIGURE 3, the wheels 24a and 24b are somewhat spaced apart to receive the pipe in frictional engagement with the tires 58. Therefore, as the wheels 24a and 24b revolve, the pipe is also revolved, and the offset axes of rotation cause the pipe to translate or move to the right. The rate of linear movement of the pipe is determined by the speed of rotation of the motor 56 and the degree of angular offset of the wheels supporting the pipe. The degree of offset is accomplished uniformly for each of the sets of idler wheels and drive wheels by means of a linkage 62 (FIGURE 2). The linkage 62 includes a gang rod 64 which is pivotally affixed to each of the tables 48. Specifically, the tables 48 bearing the sets of idler wheels are affixed to the rod 62 by radial arms 68 while the larger tables supporting the drive wheels are affixed to the rod 62 by extensions 68. In this regard, the extension 68a (associated with the table 48a) is of increased length and receives a turn buckle 70 (FIGURE 4) coupling the tab 68a to a fixed arm 72 on the stand 50. Thus, the turn buckle 70 may be adjusted to vary the length of interconnected rods 74 and thereby variously revolve the circular table 48a while simultaneously displacing the rod 64 to similarly revolve each of the other tables 48. Thus, by adjusting the turn buckle 70, the angular offset between the axes of all the wheels in the unit and the cylindrical axis of the pipe may be easily and conveniently adjusted.

In a related regard, it is to be noted that the tables 48 (FIGURE 3) incorporate an annular rim 76 which is matingly received in a groove that is defined in the stand 50 to preserve the angular displacement of the table in a substantially circular pattern.

In the system as illustratively described, three drive motors 56a, 56b and 56c have been disclosed, each for motivating a set of drive wheels. It is apparent that in some systems, it may be desirable to provide additional drive power by increasing the number of drive motors. Such systems are clearly contemplated by the present invention and involve simply the addition of drive wheels powered by motors as previously described. Whether drive is provided by three individual motors as described above, or by three groups of motors, the independent control thereof is the important aspect. That is, the motor 56a has control independent of the motor 56b, as does the motor 56c. As indicated, each of these individual motors may comprise a plurality; however, in such an installation sets of drive wheels whether alone or in plurality must be terminated with at least one set of idler wheels.

Considering the three separate drive means, as represented by the three motors 56a, 56b and 56c, reference will now be made to FIGURE 5 illustrating a system for controlling three separate drive units, each of which may include a plurality of motors. The interrelated drive motors 56a, 56b and 56c are diagrammatically represented in FIGURE 5 and it is readily apparent that additional motors may be coupled in parallel with each of these motors. The motors 56 are similar and each includes a field winding 78 and a rotor 80. The letters a, b, and c will be used in association with the motors 56a, 56b and 56c respectively to identify other components. The field windings 78 are connected across conductors 82 and 84 which emerge from a speed and direction control circuit 90, which also provides energy to conductors 92 and 94 across which the rotor 80 is connected. Similar components are provided for the motor 56b, identified by similar reference numerals with an identifying letter b for distinction. A similar identification is utilized for the motor 56c, utilizing the letter c for purposes of distinction. It is to be understood, that each of these interrelated structures may be similar, although a wide variety of specific forms are well known in the prior art and readily available.

The speed and direction control circuits 90a, 90b and 90c are all connected to a regulated power supply 100 which is energized through switches 102 and fuses 104 from energy supply terminals 106. Considering the structure preliminarily, upon closure of the ganged switches 102, the regulated power supply is adjusted, as by means of a control lever 108, to provide a uniform potential to each of the speed and direction control circuits 90a, 90b and 90c. Such uniform potential then serves to drive the motors 56a, 56b and 56c at a uniform speed until a modification in that speed is commanded by actuating an element in one of the speed and direction control circuits. As a result, the motors may be controlled to displace pipes carried on the conveyor 11 (FIGURE 1) at a desired rate of relative displacement.

Considering the electrical system in somewhat greater detail, it is apparent that a wide variety of different structures may be employed; however, in the specific arrangement disclosed herein, the power terminals 106 are to be connected to a source of three-phase potential which is then applied through the fuses 104 and the switches 102 to the regulated power supply 100. The power supply 100 may take a wide variety of different forms including rheostats, variable transformers, or electronic control apparatus, to provide three separate, but uniform output potentials to the speed and direction control circuits 90a, 90b and 90c.

The circuits 90 comprise a switching network for independently controlling the energization of the motors 56. Specificallly, the circuits 90 provide a forward control push button 110, a reverse control push button 112, a fast button 114, and a stop button 116. The implementation of the control circuits 90 may include switching means controlled by the forward button 110, the reverse button 112 and the stop button 116 (in the form of a double-pull double-throw switch) for energizing the motors 56 to stop or revolve in either direction in accordance with the last depressed button. Additionally, the circuit includes a switching means as well known in the prior art to apply energizing voltage to the motor 56 which will increase the speed thereof upon depression of the momentary-contact switch button 114. Of course, a wide variety of different techniques for speed control are well known in the prior art, some of which are disclosed beginning on page 602 of a book entitled, Principles of Alternating-Current Machinery, by Ralph R. Lawrence published by McGraw-Hill Book Company, Inc., 1940. In view of the state of the art of speed control mechanisms and the wide variety of techniques that can be employed, a detailed consideration is not provided herein.

Functionally, the speed and direction control circuits 90 are similar and each includes a forward control button 110 which sets the motor 56 in forward motion at standard speed; a reverse button 112 which sets the motor 56 in reverse at standard speed; a stop button 116 which halts the motor 56; and a fast button 114 which increases the speed of the motor 56.

A complete knowledge of the system may now best be afforded by pursuing an exemplary operation. Therefore, assume it is desired to process a series of pipes of a predetermined size and weight. Thereupon, the turn buckle 70 (FIGURES 3 and 4) is revolved to adjust the rods 74 to, in turn, set the position of the rod 64 (FIGURE 2) which establishes the angular offset of the wheels with respect to the linear path of the pipes. That is, in accordance with the size of the pipes to be processed, the pairs of wheels are gang positioned by the rod 64 so that the axes of rotation of all the wheels are offset an established amount, relative the cylindrical axis of the pipes passing along the linear path.

Upon completion of the angular adjustment, the electrical system is energized by closing the switches 102 (FIGURE 5), setting the adjustment lever 108 and pushing the forward control button 110 on each of the speed and direction control circuits 90. As a result, the motors 56 are set in motion to drive the associated drive wheels 24, 26 and 28. Next, a section of pipe is placed to lie on at least the wheels 24 and 30 (FIGURE 1), substantially as shown to be occupied by the pipe P1. As the motor 56a drives the wheels 24 (FIGURE 3) the pipe is revolved and simultaneously traversed across the wheels. The frictional engagement between the wheels and the pipes permits very little slippage so that accurate control is afforded.

As the pipe continues to roll and traverse, it passes onto the wheels 32 (FIGURE 1) and is then carried as the first pipe in the series through the stream of fluid 14 dispensed from a hopper 120. The stream 14 coats the pipe with fluid, the excess falling into a reservoir 122. The pipe in process then continues its movement along its cylindrical axis, simultaneously revolving and upon reaching a position appropriate to the operation, the wrappers 16 are started on the pipe to be dispensed from the rollers 124. Once this dispensing has been initiated, it will continue automatically due to the revolution of the pipe.

As the pipe continues along its path, a section thereof which has been wrapped encounters the wheels 26 which are driven by the motor 56b operating at the same speed as the motor 56a so that the pipe continues to be moved in the desired pattern. When the first pipe clears the wheels 24, another pipe is placed to lie on the wheels 24 and 30 to be next in the sequential process. It is readily apparent that some gap or space will exist between the two pipes as indicated to be closed by the joint 18. To eliminate the gap, the momentary-contact fast button 114a is depressed causing the motor 56a (FIGURE 1) to accelerate thereby accelerating the linear movement (as well as the rotational movement) of the pipe carried on the wheels 24 and 30 to close the gap to the next adjacent pipe to simply an abutting joint 18 as shown. Thus, the process at the input to the conveyor 11 is repeated to maintain a continuous stream of abutting pipes flowing into the treating station 12.

After a pipe has passed through the treating station 12 it departs from the wheels 26 and is moved by the drive wheels 28 powered by the motor 56b. When the pipe is in substantially the position shown to be occupied by the pipe P3, the blade 20 which may comprise any of a wide variety of different cutting tools, is lowered into the junction 22 to sever the paper wrappers and the coating which has now begun to solidify. With the pipe P3 severed from the pipe P2 in process, the former is free to move independently under a dryer unit 130 and also may encounter a cooling stage as well known in the prior art. However, significant to the operation of the system, the pipe P3 may now be rapidly moved from the conveyor by depressing the momentary-contact fast button 114c (FIGURE 5) of the circuit 90c. As a result of such depression, the motor 56c is accelerated moving the pipe P3 to broaden the gap at the space which previously constituted the junction 22. After accomplishing such displacement between the pipes, the pipe P3 may be conveniently and easily removed from the conveyor 11.

It may therefore be seen that the desired abutting relationship may be preserved at the input of the pipes to the treating station and also a desired spacing relationship may be accomplished at the output from the treating station. Control facility is also provided to reverse the motion for situations which are not routine as, for example, when the supply of wrappers 16 unexpectedly terminates and it is desired to completely reprocess a pipe that has been previously partially processed. Of course, various other situations arise wherein these control capabilities are desired.

In view of the above consideration, it is readily apparent that the system hereof provides a structure for conveying pipes in sequence through a treating station in abutting relationship wherein frictional engagement with the pipe is substantially constant and wherein relatively simple mechanical linkages are provided. As a result, the system hereof is relatively economical. Of course, it is apparent that a wide variety of different forms of the system as disclosed herein will occur to one skilled in the art. Therefore, the scope hereof is not to be limited in accordance with the illustrative embodiment provided but rather is to be determined in accordance with the claims as set forth below.

What is claimed is:

1. A conveyor for moving pipes along a substantially linear path through a treatment station, while rotating said pipes for treatment, comprising:
   a plurality of pairs of rotatively-mounted cooperating wheels, said wheels in each pair being mounted to support one of said pipes therebetween;
   means supporting said pairs of wheels in spaced-apart relationship along said linear path with the axis of each of said wheels in a pair parallel to each other and offset from said linear path, to move said pipes through said treatment station;
   first electrical drive motor means for rotatively driving certain of said wheels to carry said pipes to said treatment station;
   second electrical drive motor means for rotatively driving other of said wheels to carry said pipes through said treatment station;
   third electrical drive motor means for rotatively driving still other of said wheels to carry said pipes away from said treatment station; and
   control means for independently controlling the rate of rotation of said first motive means, relative the rate of rotation of said second motive means.

2. A conveyor according to claim 1 further comprising control means for independently controlling the rate of rotation of said third motive means relative the rate of rotation of said second motive means.

3. A conveyor according to claim 1 wherein said control means includes means for accelerating said first motive means and said third motive means with reference to said second motive means.

4. A conveyor according to claim 1 wherein said means supporting said pairs of wheels comprise turn tables for variously adjusting the offset of the axes of said wheels and said linear path.

5. A structure according to claim 3 wherein said certain of said wheels are separated by other of said wheels and wherein said wheels include a tread of rubber-like material.

6. A structure according to claim 3 wherein said control means includes a power supply for supplying uniform potential power to each of said motive means, each comprising at least one electric motor.

7. A structure according to claim 6 wherein said system further comprises treatment means for processing said pipes during conveyance.

8. A structure according to claim 7 wherein said control means includes means for independently accelerating each of said electrical motors.

9. A conveyor system according to claim 1 wherein said wheels include tread means of rubber-like material to frictionally engage said pipes; and wherein each of said motive means comprises at least one electrical motor; and wherein said control means comprises a common control for providing a predetermined potential to each of said motors, and plural individual controls for controlling said motor individually.

References Cited

UNITED STATES PATENTS 3,172,591  3/1965  Norton _____ 214—339

HUGO O. SCHULZ, *Primary Examiner.*